United States Patent
Warnod

[11] 3,733,497
[45] May 15, 1973

[54] ELECTRONIC FLASHER

[75] Inventor: Bertrand A. Warnod, Neuilly-sur-Seine, France

[73] Assignee: Klaxon S.A., Neuilly-sur-Seine, France

[22] Filed: Dec. 2, 1971

[21] Appl. No.: 204,231

[30] Foreign Application Priority Data

Dec. 4, 1970 France..................................7043695

[52] U.S. Cl.................307/132 E, 315/131, 315/133, 317/148.5, 340/81 R
[51] Int. Cl..............................................H01h 47/00
[58] Field of Search...........................317/146, 148.5; 340/81 R, 81 E, 340; 307/132 R, 132 E; 315/129, 130, 131, 133; 331/113 R

[56] References Cited

UNITED STATES PATENTS

| | | | |
|---|---|---|---|
| 3,209,175 | 9/1965 | Deeg | 307/132 E |
| 3,281,611 | 10/1966 | Leeder, Jr. | 307/132 E |
| 3,452,248 | 6/1969 | Leeder, Jr. | 317/148.5 |

*Primary Examiner*—Gerald Goldberg
*Attorney*—Martin Fleit, Jim W. Gripple and Harvey B. Jacobson Jr. et al.

[57] ABSTRACT

A circuit for respectively flashing signal lamps. The circuit includes at least two cooperable transistors, charging circuit with a main capacitor, a secondary capacitor to ensure stable operation, a main relay, a secondary relay, and a direct current source. The circuit is designed to be insensitive to transistor current gain variations and to be immune to parasitic capacitances.

4 Claims, 5 Drawing Figures

3,733,497

ELECTRONIC FLASHER

This invention relates to an electronic flasher, more particularly for controlling signalling lights.

Different systems of electronic flashers are known formed by astable multivibrators with two transistors, associated with one or two coupling capacitors, and controlling directly or through amplifying transistors, the signalling lights or operating relays controlling the lighting up of these lights.

In the case of astable multivibrators with two coupling capacitors, where only two transistors are to be used, it is necessary either to choose them in such a way that they have a high saturation gain, or to use high capacitances. Moreover, one capacitor determines the length for which the light is lit, and the other the length of the extinction period, and from this results the necessity to match these capacitors if a defined relationship between these two periods is to be obtained.

In the case of astable multivibrators with a single capacitor, it is no longer necessary to provide high gain transistors or a high value capacitor, and the relation between the lighting up and extinction times depends only on this single cepacitor. However circuit performance of this type of assembly depends critically on the transistor current gains, thus requiring more expensive, closer tolerance transistors and subjecting the flashing rate to temperature fluctuations.

Since these two assemblies are switching elements with flip-flop characteristics, they have in addition a common defect, i.e. they are very sensitive to any parasitic capacitances affecting their supply.

The present invention has the object of providing an electronic flasher which enables these drawbacks to be avoided, and which has the advantages of making possible the use of transistors with a large gain tolerance and of being relatively insensitive to parasitic capacitances.

Such a flasher, having transistors, capacitors and resistors co-operating with the transistors, relays, a control inverter for the signalling units, and a supply of direct current, is characterized substantially in that it comprises an amplifier consisting of at least an input transistor and an output transistor, a main relay located in the emitter-collector circuit of the output transistor, and actuating a commutator connected to one pole of the supply source and comprising a rest contact and a working contact, a secondary relay associated with the control of the signalling units, and with the working contact, and operating a contact, a first and a second voltage divider with resistors, a main capacitor and a secondary capacitor, wherein the rest contact is connected on one hand through the first voltage divider to an a lead of the main capacitor, and on the other hand to the contact of the secondary relay, wherein the working contact is also connected to a dividing point of the second voltage divider of which another tap connects the second lead of the main capacitor and the base of the input transistor, biased in such a way that this transistor is saturated and conducting when the flasher is at rest, wherein the main capacitor alternatively turns off and saturates this transistor when the signal flasher is switched on, regulating thereby the light-extinction rate and making the assembly less sensitive to parasitics by means of its mounting, whilst the secondary capacitor is associated with the output transistor to enable the latter to be held off during the transfer period between working contact and rest contact of the commutator of the main relay.

This arrangement has also the following advantages:
the high gain of the amplifier makes it possible to use a capacitor with low capacitance;
the use of contacts of the main relay in conjunction with the electronic circuit makes it possible to use circuits such as the gain of the transistors which practically no longer affect the flashing rate;
a single capacitor determines both the lighting up time and the extinction time; once the value of the resistors associated
therewith have been calculated, the value of this capacitor can no longer affect the ratio between these two periods;
the operating cycle starts with a lighting up;
little sensitivity to parasitic capacitances; response to a parasitic can occur only if its duration exceeds that of the response time of the main relay.

Other features of the invention will become apparent from the following description of three embodiments, given merely by way of example, and shown in the accompanying drawings in which.

Figure 1:
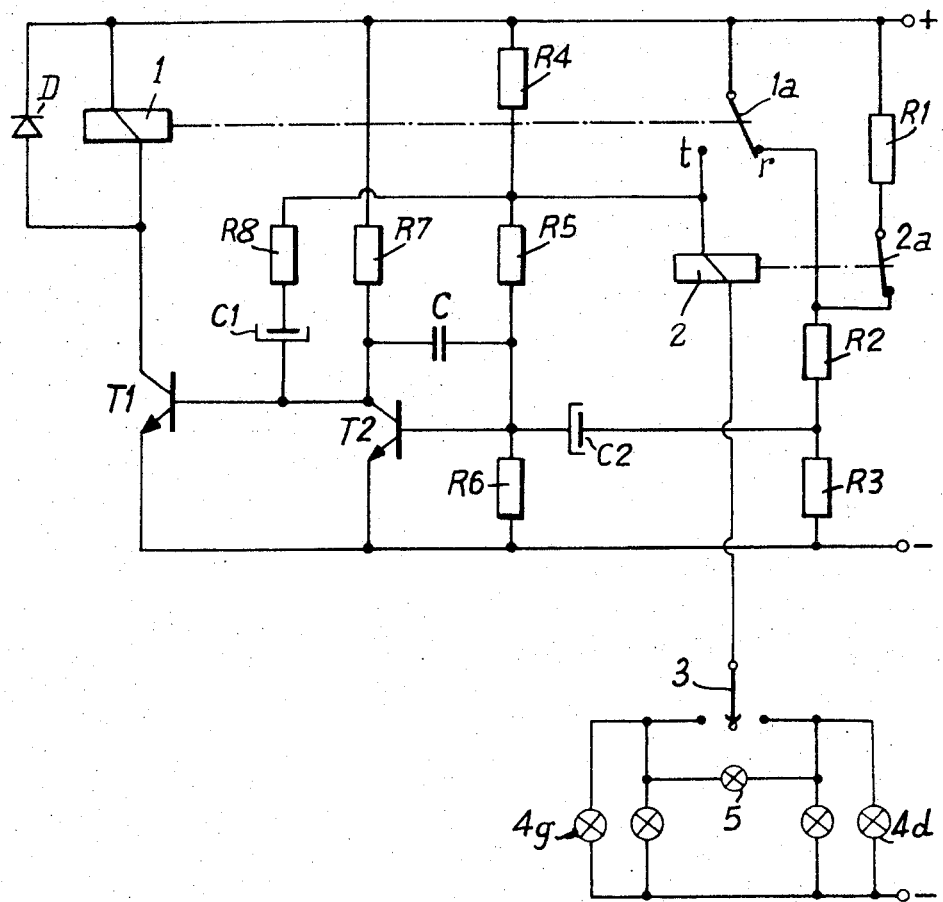
FIG. 1 is an electric circuit diagram in the inoperative position, showing a flasher with n-p-n transistors.

Referring now to FIG. 1, it may be seen that the flasher comprises an amplifier formed by two transistors T1 and T2, a main relay 1, a secondary relay 2, a main capacitor C2, a secondary capacitor C1, and a control switch 3 for two groups 4g and 4d of two signalling lamps operated by this switch.

The two transistors T1 and T2 are n-p-n transistors. The collector of the output transistor T1 is connected through the main relay 1 to the "+ pole" of the supply, and the collector of the input transistor T2 is connected on one hand to the " + " pole across a charging resistor R7, and on the other hand to the base of the transistor T1. The emitters of the transistors T1 and T2 are connected to the "—" pole of the supply source.

The main relay 1 controls a switch 1a whose moving arm is connected to the "+" pole of the supply source. In the inoperative position of the device, the relay is not energized and the arm is in contact with the fixed rest contact $r$ connected by a first voltage divider, formed by resistors R2 and R3 mounted in series, to the "—" pole of the supply source. The fixed working contact $t$ of the relay 1 is connected on one hand through a secondary measuring relay to the key of the switch 3, which controls the lighting up of two groups of signalling lamps 4g and 4d, for example the left-hand and righ-hand direction indicators of a mechanically propelled vehicle. On the other hand, the working contact $t$ is connected through a resistor R8 to one lead of a capacitor C1, the other lead of which is connected to the base of the output transistor T1.

A second voltage divider comprising resistors R4, R5 and R6 mounted in series, is connected at one end to the "+" pole of the supply circuit and at the other end to the "−" pole of the same circuit, whilst the junction of the resistors R4 and R5 is connected to the working contact $t$ of the relay 1, and the junction of the resistors R5 and R6 is connected to the base of the input transistor T2, and to the "−" pole of the main capacitor C2. The "+" terminal of the capacitor C2 is connected to the junction of the resistors R2 and R3 of the first voltage divider.

The secondary measuring relay 2 operates an opening contact 2a whose moving arm is connected through a resistor R1 to the "+" pole of the supply source, whilst the fixed contact is connected to the rest contact $r$ of the main relay, so that the contact 2a is cooperating with the first voltage divider R2-R3.

The resistors R3, R4, R5 and R6 have such values that transistor T2 is conducting in the quiescent state. The same also applies to the resistors R7 and R8 when the capacitor C1 blocks the transistor T1.

A capacitor C is mounted between the collector and the base of the input transistor T2 to prohibit the system from undergoing spontaneous oscillations as a reaction to parasitic capacitances of the assembly or of the transistors.

A diode D is connected to the terminals of the main relay 1 to dampen tensions induced by the coil of this relay.

The supply circuit for the flashing lamps 4g and 4d comprises a warning lamp 5 connected between the two units 4g and 4d; this lamp indicates the proper operation of the flasher.

The signalling lamps are connected to the negative terminal of the supply source.

Figure 2:
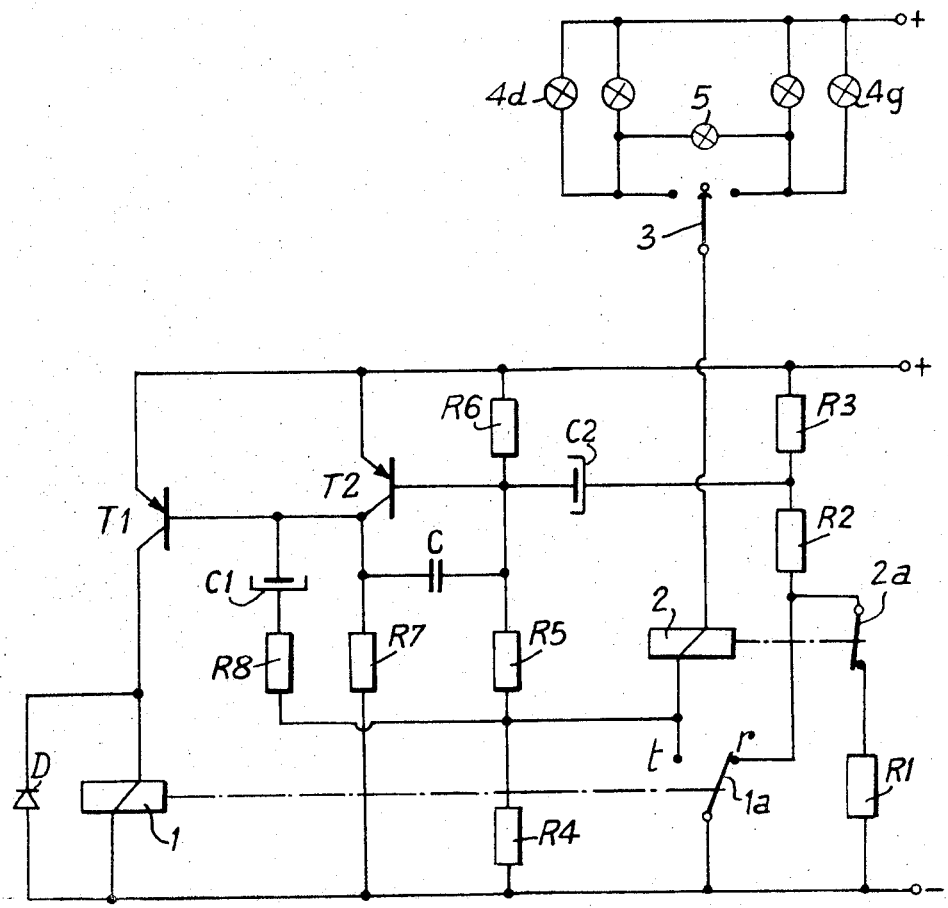
FIG. 2 is an electric circuit diagram of a flasher in inoperative position, in which p-n-p transistors are used.

In a second embodiment of the invention, shown in FIG. 2, the transistors T1 and T2 are of the p-n-p type. For this reason the supply poles are reversed. The resistors R1, R4 and R7 and the moving arm of the switch 1a are connected to the "−" pole, and the resistors R3 and R6 and the emitters of the transistors T1 and T2 are connected to the "+" pole. The signalling lamps are, therefore, connected to the "+" pole of the supply source, whilst the control 3 is connected through the relay 2 and the switch 1a to "−". Apart from that, the diagram is identical with that of FIG. 1.

Figure 3:
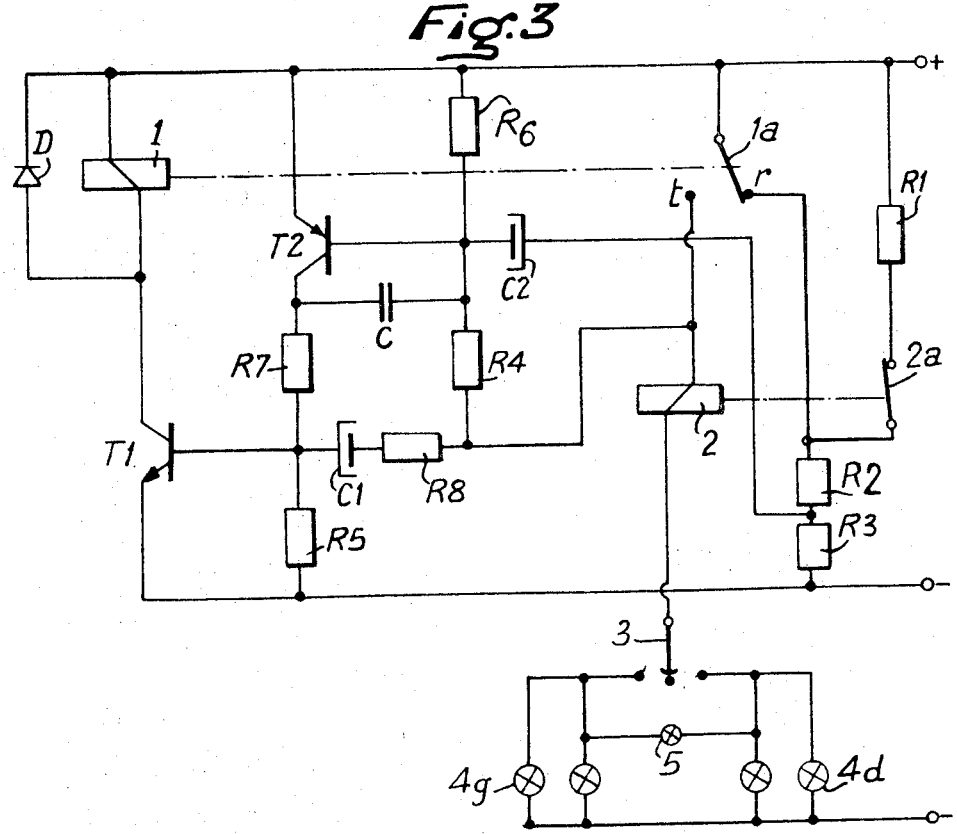
FIG. 3 is an electric circuit diagram in the inoperative position, in which one transistor is an n-p-n transistor, and the other transistor a p-n-p transistor.

In a third embodiment of the invention, shown in FIG. 3, one of the transistors, for example T1, is an n-p-n transistor and the transistor T2 is a p-n-p transistor. With regard to FIG. 1, nothing has changed concerning the connection of the emitter and of the collector of the transistor T1, and the main relay 1, or concerning the connection of the secondary relay 2 to the switch 3 for the signalling lamps 4g, 4d, and its contact 2a with the resistor R1 with the rest contact $r$ of the switch 1a of the main relay 1.

On the other hand, the connection of the collector of the transistor T2 to the base of the transistor T1 passes now through the resistor R7; the resistor R5 connects this base with the "−" pole of the supply source and the resistor R4 connects the base of the transistor T2 to the working contact $t$ of the switch 1a.

The operation of the flasher will be described in the following by way of example, with reference to FIG. 1, whilst the operation of the modifications according to FIGS. 2 and 3 is similar, taking into consideration that in the modification according to FIG. 3 the transistors T1 and T2 are conducting and blocked at the same time.

In the inoperative state, the control switch 3 is opened, the input transistor T2, whose base is biased positive relative to its emitter through the resistors R4, R5, is in the saturated conducting condition. Its low collector voltage thus prohibits the output transistor T2 from conducting. The capacitor C2 is charged through the rest contact $r$ of the switch 1a of the main relay 1, and the dividing bridge R1-R2, the base emitter junction of T2 and the resistor R6. The capacitor C1 is charged across the junction R4-R5 of the divider R4-R5-R6 in parallel with the base emitter junction of T2, and through the resistor R8 on one side and the collector emitter junction of T2 on the other.

When the switch 3 is switched to the lamps of one of the groups 4g or 4d, the base of the transistor T2 is connected to the "−" of the supply source across the lamp resistance, which is small compared with the resistor R4 of the divider R4-R5, and across the winding of the second relay 2 which has also a low resistance. The transistor T2 is, therefore, turned off and the transistor T1 is conducting, since it receives a positive voltage through resistor R7. The current passes, therefore, through the emitter and the collector to energize the main relay 1, which attracts the arm of its switch 1a towards the working contact $t$, thereby closing the circuit of the signalling lamps and energizing the secondary relay 2 which opens the contact 2a.

Figure 5:
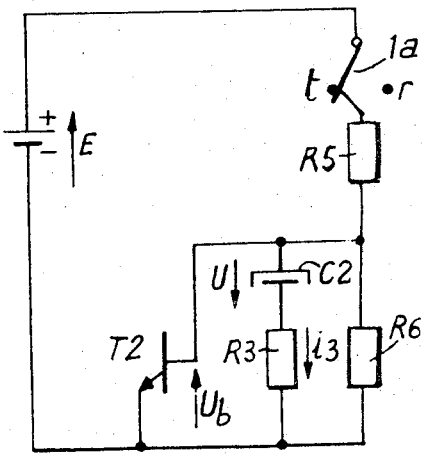
FIG. 5 shows the same detail during the discharge of the main capacitor, wherein the switch of the main relay is in the working position.

The transistor T2 remains turned off for so long as the capacitor C2 does not enable it by its discharge to have a sufficiently positive voltage at its base, this discharge takes place, according to FIG. 5, across the resistors R5, R3, R6 and the supply source. During the discharge, the resistor R3 carries a current i3; if U is the discharge voltage of the capacitor C2, the base of the transistor T2 will have a voltage $U_b = R3\ i3 - U < 0$.

The base of the transistor is, therefore, reverse biased for so long as the discharge has not taken place.

The capacitor C1, which has rapidly discharged when the switch 3 was repositioned, is charged again across the working contact $t$ of the switch 1a of the main relay 1, the resistor R8, and through the base emitter junction of the transistor T1. When the transistor T2 is again conducting, it turns off the transistor T1, causing the deenergization of the relay 1 and the moving contact of the switch 1a leaves its working contact $t$.

Figure 4:
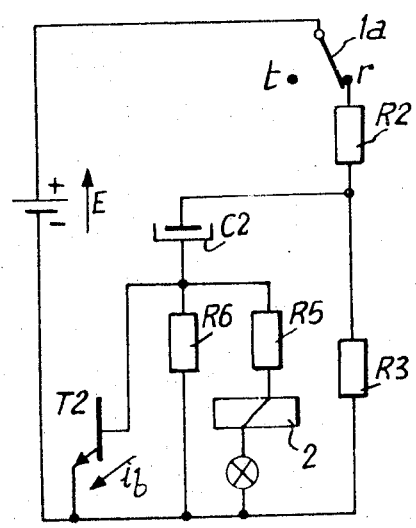
FIG. 4 shows a detail of the diagram during the charge of the main capacitor, wherein the switch of the main relay is in the inoperative position.

From this moment, the system might enter into oscillations, because the transistor T2 becomes again blocked since its base receives negative voltage through the extinguished lamps. However, the capacitor C1 starts its discharge through the resistor R7-R8 and the lamps 4d or 4g, thereby completely blocking the transistor T1. The switch moves towards its rest position $r$, and the capacitor C2 is charged, as shown in FIG. 4, through the contact $r$ and the voltage divider R2-R3 on one hand, and the resistor R6 in parallel with R5- relay 2-lamps, all in parallel with the base emitter junction of the transistor T2 on the other hand. The current flowing in the base of the transistor T2 keeps the transistor saturated, and the relays 1 and 2 are, therefore, at rest. The resistors R2-R3-R5 and R6 have such a value that the current flowing in R5-R6 is much higher than the current in the base of the transistor T2 at the instant of its desaturation. For this reason, the current gain of T2 has only little influence on the charge of C2.

When the current in the base of the transistor T2 is no longer sufficient to maintain the same in its saturated state, the transistor becomes blocked, causing thereby the transistor T1 to open; the cycle starts again if the key of the switch 3 remains connected to one group of lamps 4d or 4g. The warning lamp 5 mounted on the instrument panel in the case where the device is mounted on a vehicle, indicates to the driver the correct operation of the flasher.

If one of the signalling lamps has failed, the current passing through the secondary relay 2 no longer gives a sufficient number of ampere-turns to attract its opening contact 2a. The resistor R1 remains, therefore, constantly in the circuit R1-R2-R3. The charging circuit for the capacitor C2 does not change, its discharge circuit is modified and the transistor T2 remains blocked for a shorter period. The flashing rate is accelerated to a noticeable degree, and the driver of the vehicle is warned of the defect.

By way of modification, the secondary relay 2 could control directly the warning lamp 5 without intervening into the flashing rhythm. In this case, the defect would be indicated by failure of the warning lamp to light up.

The utilization of the electronic flasher according to this invention is not limited to a motor car as described hereinbefore. The flasher may also be used for controlling signals on building sites, warning lights, and any other equipment without thereby departing from the principle of the invention.

What I claim is:

1. An electronic flasher device for actuating signalling means energized by a direct current supply source and controlled through an operating switch, comprising an amplifier device having a first transistor and a second transistor, a main relay inserted in the emitter-collector circuit of said second transistor between the collector and a pole of said current supply source, a change-over switch operated by said relay and having a rest contact and a working contact which are alternately connected to said pole when said main relay is energized and de-energized, a secondary relay inserted in series between said working contact and said operating switch and actuating an auxiliary contact, a first voltage divider connected between said change-over switch rest contact and the second pole of said current source, a second voltage divider connected between the poles of said current source and having a first tap connected to said change-over switch working contact, a main capacitor and a secondary capacitor, said main capacitor determining the flashing rate of said signalling means and having its first terminal connected to a tap of said first voltage divider and having its second terminal connected to the base of said first transistor and to a second tap of said second voltage divider, the base of said first transistor being biased in such a way that said first transistor is saturated when said operating switch is in its rest position and alternately turned off and saturated by the discharging and charging action of said main capacitor while said second transistor is alternately saturated and turned off and said main relay energized and de-energized, said secondary capacitor being inserted in said device so as to enable said second transistor to be turned off during the transfer period of said change-over switch from working contact to rest contact.

2. An electronic flasher as claimed in claim 1, wherein said secondary capacitor has one terminal connected to the base of said second transistor and the other terminal connected through a resistor to said second tap of said second voltage divider and wherein said second tap of said second divider is also connected to the working contact of said change-over switch.

3. An electronic flasher as claimed in claim 2, wherein one of said transistors is of the n-p-n type and the other of the p-n-p type and wherein said secondary capacitor has its resistor in series in the second voltage divider.

4. An electronic flasher as claimed in claim 1, wherein a resistor is connected to said first pole of said current supply source and wherein said auxiliary contact of said secondary relay is a rest contact and is connected between the rest contact of said main relay operated change-over switch and said resistor.

* * * * *